US007066663B2

(12) United States Patent
Cheng

(10) Patent No.: US 7,066,663 B2
(45) Date of Patent: Jun. 27, 2006

(54) WEATHER-RESISTANT MONITORING CAMERA

(76) Inventor: Yi-Jen Cheng, 9F, No. 21, Sec. 2 Chorngder 2 rd, Taichung (TW)

( * ) Notice: Subject to any disclaimer, the term of this patent is extended or adjusted under 35 U.S.C. 154(b) by 107 days.

(21) Appl. No.: 10/932,439

(22) Filed: Sep. 2, 2004

(65) Prior Publication Data
US 2006/0045499 A1 Mar. 2, 2006

(51) Int. Cl.
G03B 17/00 (2006.01)
G03B 17/08 (2006.01)
G03B 3/00 (2006.01)
G03B 13/00 (2006.01)
H04N 5/225 (2006.01)
G02B 15/14 (2006.01)
G02B 7/04 (2006.01)

(52) U.S. Cl. .................... 396/427; 396/27; 396/79; 396/144; 348/373; 359/676; 359/694

(58) Field of Classification Search ............. 396/25, 396/27, 29, 419, 427; 348/373–376, 81, 348/143, 151
See application file for complete search history.

(56) References Cited

U.S. PATENT DOCUMENTS

| 3,860,937 | A | * | 1/1975 | Wolfe | 396/27 |
| 5,541,684 | A | * | 7/1996 | Suzuki et al. | 396/435 |
| 5,694,621 | A | * | 12/1997 | Dowe et al. | 396/25 |
| 5,822,622 | A | * | 10/1998 | Inoue | 396/27 |
| 6,795,110 | B1 | * | 9/2004 | Kossin | 348/81 |
| 2004/0171912 | A1 | * | 9/2004 | Shimizu | 600/112 |

FOREIGN PATENT DOCUMENTS

GB         2396435 A  *  6/2004

* cited by examiner

Primary Examiner—W. B. Perkey
Assistant Examiner—Rishi Suthar
(74) Attorney, Agent, or Firm—Alan D. Kamrath; Nikolai & Mersereau, P.A.

(57) ABSTRACT

A weather-resistant monitoring camera has a case, a camera set, a frame, a lens and an adjusting assembly. The case has a body to receive the camera set, the frame, the lens and the adjusting assembly. The frame is used for holding the camera set in place and the camera lens is mounted on the camera set. The adjusted assembly is used for adjusting the lens and is mounted outside the body. Because the camera lens is mounted inside the body and can be adjusted by the external adjusting assembly, rain, wind and a force of shock will not damage the camera lens.

6 Claims, 4 Drawing Sheets

US 7,066,663 B2

WEATHER-RESISTANT MONITORING CAMERA

BACKGROUND OF THE INVENTION

1. Field of Invention

The present invention relates to a monitoring camera, and more particularly to a monitoring camera that is weather-resistant outdoors.

2. Description of the Related Art

Monitoring cameras have become ubiquitous due to the need for personal safety, and are deployed both indoors and increasingly outdoors. However, the monitoring cameras set up outdoors are easily damaged by wind and rain, because the lenses are extended out of the case of the monitoring cameras. Furthermore, it is found that the focus is often lost because of the impact of severe weather on the camera.

Specific disadvantages of the conventional monitoring camera are described as follows.

1. When the conventional monitoring camera is used in outdoors, rain easily permeates the camera at the joint between the lens and case. Even though the joint between the case and the lens is treated with waterproof material, the joint easily loses the waterproof feature over a long period of use.

2. Also, when the conventional monitoring camera is used outdoors, the camera lens easily loses focus because the force of wind or shock, and thus a person often needs to adjust the camera lens.

The weather-resistant monitoring camera in accordance with the present invention obviates or mitigates the aforementioned problems.

SUMMARY OF THE INVENTION

The primary objective of the present invention is to provide a weather-resistant monitoring camera having a case, a camera set, a frame, a lens and an adjusting assembly. The case has a body to receive the camera set, the frame, the lens and the adjusting assembly. The frame holds the camera set in place and the lens is mounted on the camera set. The adjusting assembly is used for adjusting the lens and is mounted outside the body. Because the lens is mounted inside the body and can be adjusted by the adjusting assembly located outside the body, rain and wind will not damage the lens.

Other objectives, advantages and novel features of the invention will become more apparent from the following detailed description when taken in conjunction with the accompanying drawings.

DETAILED DESCRIPTION OF THE INVENTION

Figure 1:
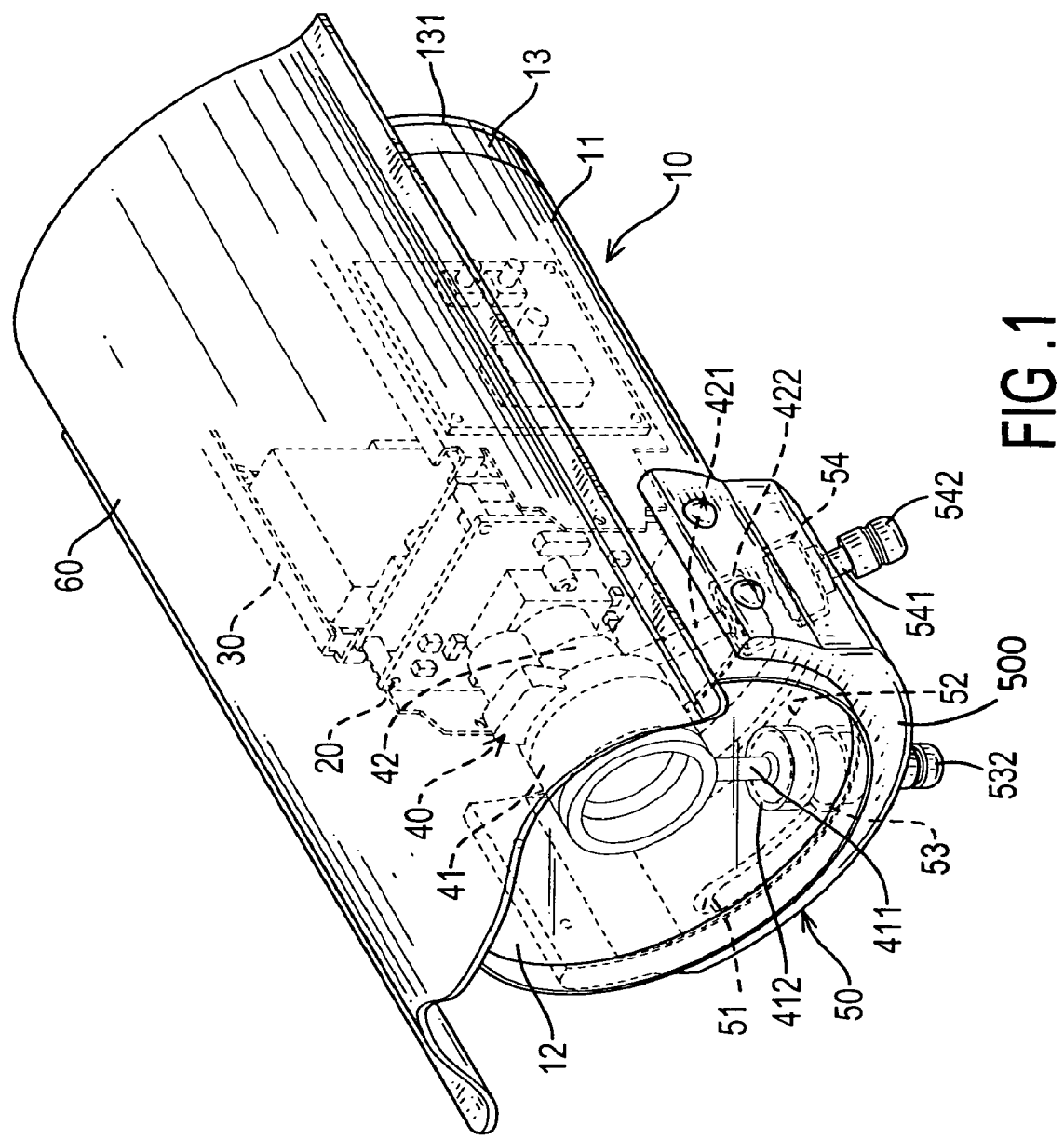
FIG. 1 is a perspective view of a weather-resistant monitoring camera in accordance with the present invention.
Figure 2:
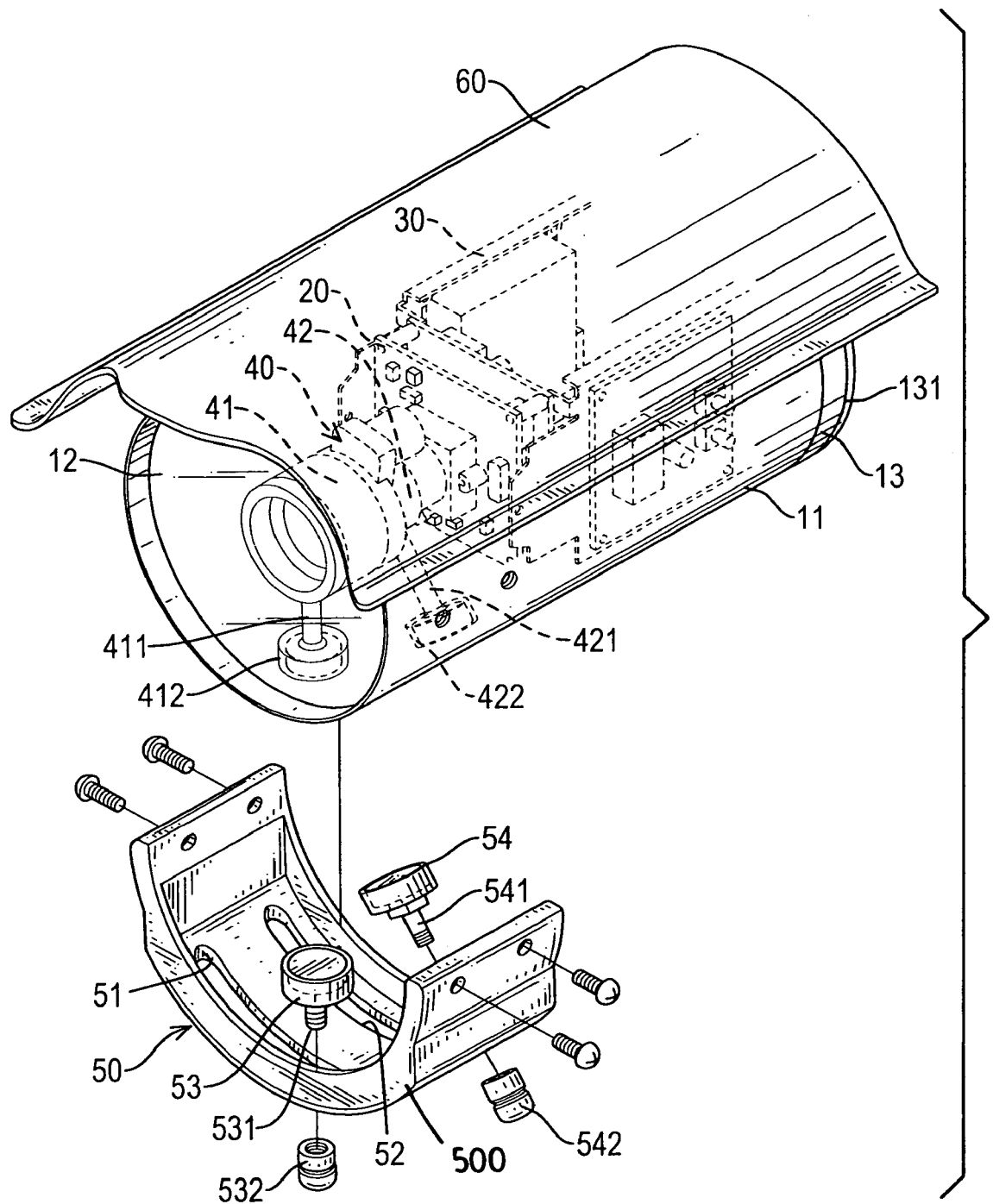
FIG. 2 is a partially exploded perspective view of the weather-resistant camera in FIG. 1.
Figure 3:
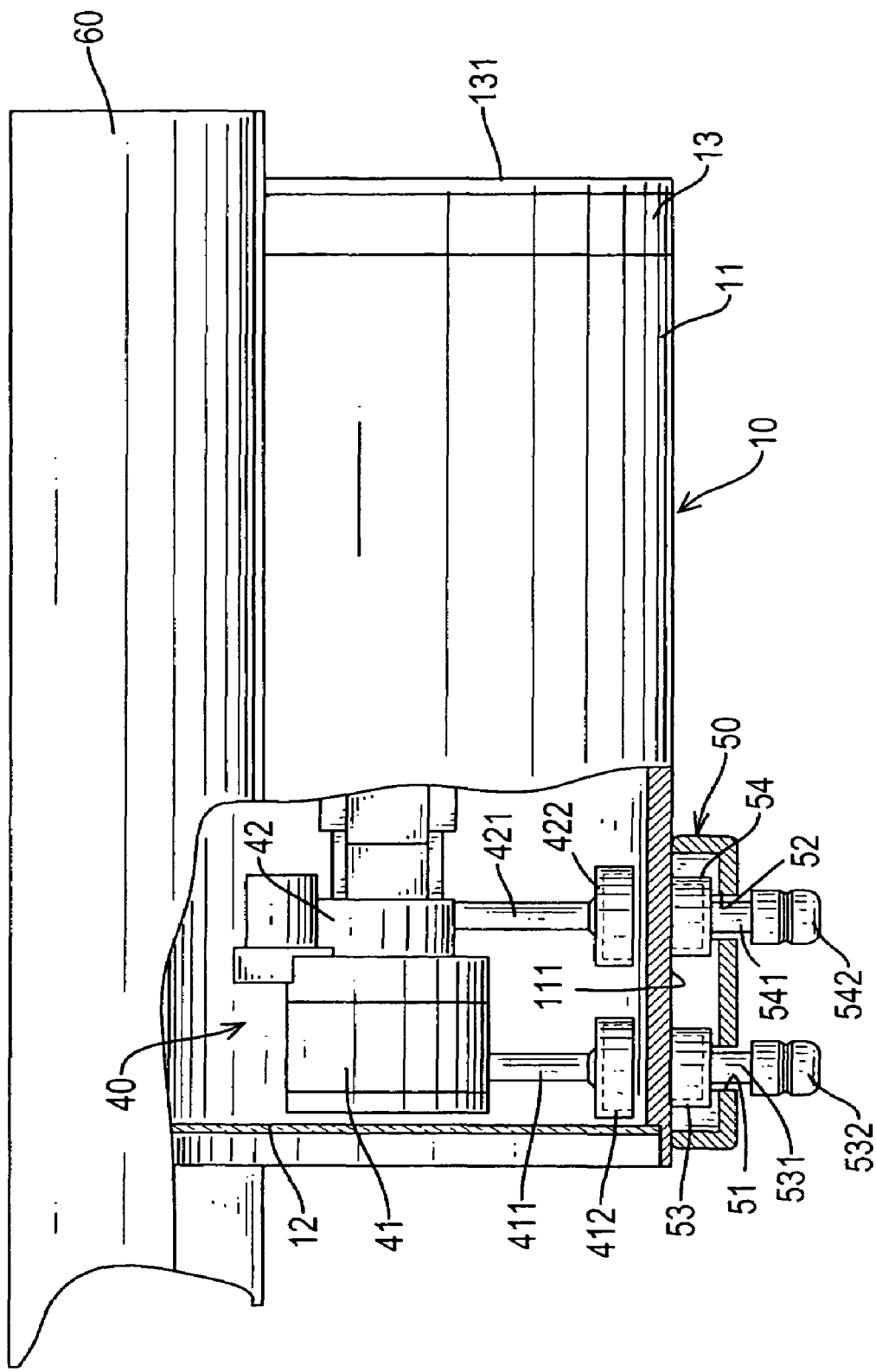
FIG. 3 is a side plan view in partial section of the weather-resistant camera in FIG. 1.
Figure 4:
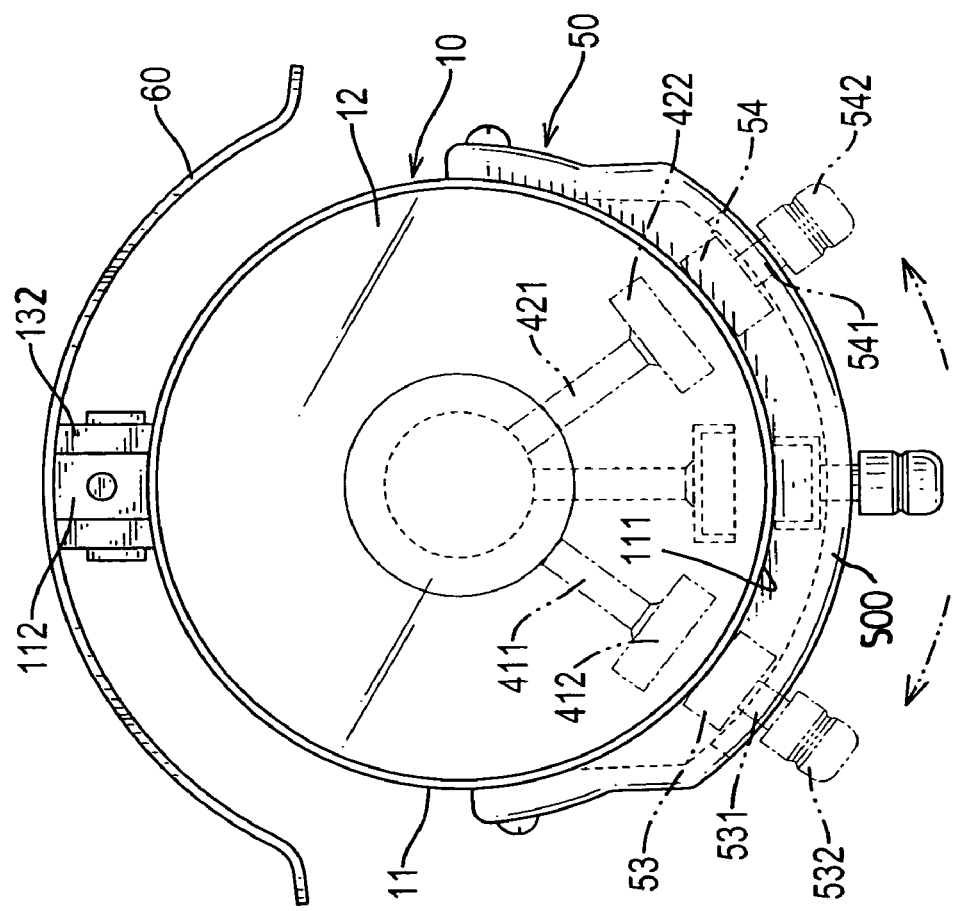
FIG. 4 is a front plan view of the weather-resistant camera in FIG. 1.

With reference to FIGS. 1 to 4, a weather-resistant monitoring camera in accordance with the present invention has a case (10), a camera set (20), a frame (30), a lens (40), an adjusting assembly (50) and an optional cover (60).

The case (10) has a body (11), a transparent window (12) and a cap (13). The body (11) has a top, a bottom, a front end, a rear end, an inner bottom surface, a cavity, a length and a tongue (112). The tongue (112) is extended out from the body (11) at the front end. The transparent window (12) is mounted inside the body (11) at the front end. The cap (13) is mounted inside the body (11) at the rear end and has an outer piece (131). The outer piece (131) has an inner surface and a wing (132) toward the top of the body (11). In a preferred embodiment of the present invention, the body (11) is a cylinder or the bottom of the body is formed g as an arcuate bottom (111).

The camera set (20) is mounted in the cavity of the body (11) and fixed by the frame (30), which is in turn in the cavity of the body (11) and has two ends. One end of the frame (30) is fixed with the inner surface of the outer piece (131), the other end of the frame (30) holds the camera set (20) inside the body (11).

The lens (40) is mounted inside the camera set (20) and faces the transparent window (12). The lens (40) has an inner end, an outer end, a focus ring (41), a vari-focus ring (42), a first adjustable rod (411), a second adjustable rod (421) and two magnetic bodies (412, 422). The focus ring (41) is mounted at the outer end of the lens (40) and has a bottom. The vari-focus ring (42) is mounted at the inner end of the lens (40) and has a bottom. The first adjustable rod (411) is mounted on the focus ring (41) and has a top end and a bottom end, and the top end of the first adjustable rod (411) is longitudinally mounted on the bottom of the focus ring (41). The second adjustable rod (421) mounted on the vari-focus ring (42) and has a top end and a bottom end, and the top end of the second adjustable rod (421) is longitudinally mounted on the bottom of the vari-focus ring (42). One of the magnetic bodies (412) is mounted at the bottom end of the first adjustable rod (411) and the other magnetic body (422) is mounted at the bottom end of the second adjustable rod (421). Each adjustable rod (411, 412) can adjust either the focus ring (41) or vari-focus ring (42). Each adjustable rod (411, 412) extends to the inner bottom surface of the body (11) so that the magnetic bodies (412, 422) face the bottom inner surface of the body (11). In a preferred embodiment of the present invention, the magnetic bodies (412, 422) are magnetic substrate, such as magnets and magnetic metals.

The optional adjusting assembly (50) is mounted outside the arcuate bottom (111) and near the front end of the body (11). The adjusting assembly (50) has a seat (500), a first rod (531), a second rod (541), two attracted bodies (53, 54), a first nut (532) and a second nut (542). The seat (500) is mounted on the arcuate bottom (111) of the body (11) and has an inner surface, an outer surface, a first trail slot (51) and a second trail slot (52). The first trail slot (51) and the second trail slot (52) are respectively defined in the seat (500) and corresponding to the moving routes of the first adjustable rod (411) and the second adjustable rod (421). The first rod (531) and second rod (541) are respectively mounted in the trail slots (51, 52) and have a top end and a bottom end. The attracted bodies (53, 54) are respectively mounted at the top ends of the rods (531, 541). The first nut (532) and the second nut (542) are respectively mounted at the bottom ends of the first rod (531) and the second rod (541), and extend out the trail slots (51, 52). In a preferred embodiment of the present invention, the nuts (532, 542) are screwed on the corresponding rods (531, 541). In a preferred embodiment of the present invention, the attracted bodies (53, 54) can be magnetic metals or magnets for attracting and leading the magnetic bodies (412, 422) along the trail slots (51, 52).

The optional cover (60) is mounted on the top of body (11) and has a front end, a rear end and a length. The front end of the cover (60) is mounted with the tongue (112) of the body (11) and the rear end of the cover (60) is mounted with the wing (132) of the outer piece (131) of the cap (13). The length of the cover (60) is longer than the length of the body (11).

When the weather-resistant monitoring camera is used, firstly, a person can loosen the nuts (532, 542) from the adjusted rods (531, 541), then adjust the focus ring (41) and the vari-focus ring (42) by moving the rods (531, 541). Because the attracted bodies (53, 54) can attract and lead the magnetic bodies (412, 422) moving along the trail slots (51, 52), the focus ring (41) and the vari-focus ring (42) can be accordingly adjusted.

The advantages of the weather-resistant monitoring camera are described as follows.

1. The lens (40) is set inside the body (11) and adjusted by the rods (531, 541) extended out the body (11), so rain and wind will not damage the lens (40).

2. Also, as the weather-resistant monitoring camera in accordance with the present invention further comprises the cover (60), the weather-resistance of the camera is improved.

The invention may be varied in many ways by a person skilled in the art. Such variations are not to be regarded as a departure from the spirit and scope of the invention, and all such modifications are intended to be included within the scope of the following claims.

What is claimed is:

1. A weather-resistant camera comprising
    a case having
        a body having
            a top,
            a bottom,
            a front end,
            a rear end,
            an inner bottom surface,
            a cavity,
            a length, and
            a tongue extended out from the body at the front end.
        a transparent window mounted inside the body at the front end, and
        a cap mounted inside the body and at the rear end of the body and having
            an outer piece having
                an inner surface, and
                a wing,
    a camera set mounted in the cavity of the body,
    a frame mounted in the cavity of the body and used for retaining the camera set in the body, and
    a lens mounted inside the camera set and facing the transparent window, the lens having
        an inner end,
        an outer end,
        a focus ring mounted at the outer end of the camera lens and having a bottom,
        a vari-focus ring mounted at the inner end of the lens and having a bottom,
        a first adjustable rod mounted on the focus ring and adapted to adjust the focus of the lens, having
            a top end longitudinally mounted on the bottom of the focus ring, and
            a bottom end,
        a second adjustable rod mounted on the vari-focus ring and adapted to adjust the focus of the lens, having
            a top end longitudinally mounted on the bottom of the vari-focus ring, and
            a bottom end, and
        two magnetic bodies, one of the magnetic bodies mounted at the bottom end of the first adjustable rod and facing the bottom surface of the body, the other magnetic body mounted at the bottom end of the second adjustable rod and facing the bottom surface of the body, and
    an adjusting assembly mounted outside the bottom of the body near the front end, having
        a seat mounted on the bottom of the body having
            an inner surface,
            an outer surface,
            a first trail slot defined in the seat and corresponding to a moving route of the first adjustable rod, and
            a second trail slot defined in the seat and corresponding to a moving route of the second adjustable rod;
        a first rod mounted in the first trail slot and having
            a top end, and
            a bottom end,
        a second rod mounted in the second trail slot and having
            a top end, and
            a bottom end
        two attracted bodies mounted respectively at the top ends of the first and the second rods and respectively facing the magnetic bodies,
        a first nut mounted at the bottom end of the first rod and extending out the first trail slot, and
        a second nut mounted at the bottom end of the second rod and extending out the second trail slot.

2. The weather-resistant monitoring camera as claimed in claim 1, wherein the monitoring camera further comprises a cover mounted on the top of the body and having
    a front end mounted with the tongue of the body,
    a rear end mounted with the outer piece of the cap, and
    a length longer than the length of the body.

3. The weather-resistant monitoring camera as claimed in claim 2, wherein the body is a cylinder.

4. The weather-resistant monitoring camera as claimed in claim 2, wherein the bottom of the body is formed as an arcuate bottom.

5. The weather-resistant monitoring camera as claimed in claim 2, wherein the magnetic bodies are magnets, and the attracted bodies are magnetic metals.

6. The weather-resistant monitoring camera as claimed in claim 3, wherein the magnetic bodies are magnets, and the attracted bodies are magnetic metals.

* * * * *